(12) United States Patent
Dietz (10) Patent No.: US 6,863,505 B2
(45) Date of Patent: Mar. 8, 2005

(54) WIND DRIVEN HIGH PRESSURE WATER PUMP

(76) Inventor: Jeremy J. Dietz, 210 Pershing Cutoff, Ekalaka, MT (US) 59324

( * ) Notice: Subject to any disclaimer, the term of this patent is extended or adjusted under 35 U.S.C. 154(b) by 51 days.

(21) Appl. No.: 10/374,572

(22) Filed: Feb. 25, 2003

(65) Prior Publication Data

US 2003/0228231 A1 Dec. 11, 2003

Related U.S. Application Data

(60) Provisional application No. 60/360,110, filed on Feb. 25, 2002.

(51) Int. Cl.[7] ........................... F04B 17/00; F04B 49/00; F04B 1/00; F04B 27/08; F04B 1/26
(52) U.S. Cl. ..................... 417/334; 417/336; 417/218; 417/271; 417/269; 417/222.1; 417/293; 417/294
(58) Field of Search ................................ 417/334, 336, 417/212, 218, 271, 269, 222.1, 293, 294, 53; 60/398; 416/197 A; 415/4.4, 4.2

(56) References Cited

U.S. PATENT DOCUMENTS

| | | |
|---|---|---|
| 544,922 A * | 8/1895 | Lundqvist ................... 416/119 |
| 1,283,529 A | 11/1918 | Kleckler |
| 1,722,845 A | 7/1929 | Gonzalez et al. |
| 3,221,660 A | 12/1965 | D'Amato ...................... 103/38 |
| 3,266,434 A | 8/1966 | McAlvay ..................... 103/162 |
| 3,367,281 A * | 2/1968 | Gray ............................ 417/65 |
| 3,822,740 A | 7/1974 | Hackett ........................ 165/45 |
| 3,957,397 A * | 5/1976 | Wendler ..................... 417/271 |
| 3,970,409 A * | 7/1976 | Luchuk ....................... 416/145 |
| 4,008,006 A * | 2/1977 | Bea ............................. 417/271 |
| 4,149,092 A * | 4/1979 | Cros ........................... 290/54 |
| 4,260,325 A * | 4/1981 | Cymara ....................... 415/4.4 |
| 4,784,570 A * | 11/1988 | Bond ....................... 416/170 R |
| 5,122,036 A | 6/1992 | Dickes et al. ............... 417/222 |
| 5,174,724 A | 12/1992 | Ammons ..................... 417/35 |

* cited by examiner

Primary Examiner—Cheryl J. Tyler
Assistant Examiner—Timothy P. Solak
(74) Attorney, Agent, or Firm—Sheridan Ross P.C.

(57) ABSTRACT

This invention relates to a wind mill which is designed to convert rotational energy to mechanical energy to drive one or more pistons to raise a liquid such as water to an elevated location if necessary at a positive pressure. In addition, the present invention may be adapted to pressurize a medium, such as a gas, for storage in a reservoir.

11 Claims, 8 Drawing Sheets

WIND DRIVEN HIGH PRESSURE WATER PUMP

RELATED APPLICATION

This application claims priority to U.S. Provisional Patent Application Ser. No. 60/360,110, filed Feb. 25, 2002, which is incorporated in its entirety by reference herein.

FIELD OF THE INVENTION

The present invention relates to the transformation of wind energy to mechanical energy and, more particularly, to a device for the pumping of liquids or gas by the use of wind energy converted to rotational mechanical energy and vertical reciprocating energy.

BACKGROUND OF THE INVENTION

The use of wind mills is known in the prior art. More specifically, wind mills have been designed and used for the purpose of generating electricity or raising liquids from the earth, primarily to provide water to livestock such as cattle in remote arid locations. One common usage of a windmill was to bring water to the surface and discharge it into a holding tank. Typically, windmills are known to consist basically of familiar, expected, and obvious structural configurations, notwithstanding the myriad of designs encompassed by the prior art which has been developed for the fulfillment of countless objectives and requirements.

In the construction of devices for the raising of liquid, such as the drawing of water from a well, it is desirable to avoid the unnecessary use of fossil fuels. Typically, in modern settings, water is drawn from a well by the use of a pump including a moving piston, valving, and an electric or gasoline driven motor for driving the piston. Thus, the typical liquid lifting device is characterized by a variety of moving parts as well as a drive unit which either employs the use of fossil fuels such as gasoline, or utilizes the electric power which, in both cases, necessitates the burning of petroleum, coal, natural gas or other fossil fuels. The foregoing characteristics of the typical pumping system are disadvantageous because of the necessity for the fossil fuel consumption. The foregoing disadvantages become more severe when the liquid lifting device is to be operated at a remote site, such as in the desert, as might be the case for an irrigation project. At such remote sites, the foregoing disadvantages are exacerbated by the necessity to transport the fuel a long distance or, to construct electric power transmission lines for a long distance. Also, during times of wild uncontrolled fires, the electrical supply is usually disrupted, rendering useless the electrically driven fire fighting systems. With the advent of electricity into rural areas, many of the old windmills have been replaced with electrically driven pumps. However, large areas lie outside the reach of electrical power, thereby making it necessary to utilize wind or organic fuel supplies as alternative sources of power.

Common windmills have additional perceived deficiencies. For example, common windmills have no variation of mechanical advantage, limiting the system to no water production at low wind velocities. Further, common windmills provide no discharge pressure, thereby limiting the usage of the water to the outlet or gravity feed to lower elevations and the system can not be used in unprotected areas during periods of sustained temperatures below freezing. Additionally, common windmills typically are incapable of pumping from deep wells at low wind velocities and require high maintenance of the associated gearbox and wind motor.

Thus, it would be advantageous to provide an improved windmill with improved efficiencies and mechanical attributes and which does not require fossil fuels. It would be further advantageous to provide an adequate supply of water for domestic use and fire fighting at homes that lie outside the efficient reach of urban fire fighting equipment, and have elevations above the elevation of the windmill.

It would also be advantageous to provide a wind driven pumping system to provide water for livestock. Depending upon weather conditions and terrain, cattle and other range animals will not travel beyond a certain distance from their drinking water, thereby leaving large areas of pasture unusable while over-grazing those areas closer to the drinking water.

It is also advantageous to provide a wind-driven pumping system which will compress gas such as methane or hydrogen into a pressure bottle for utilization as a fuel in an internal combustion engine or fuel cell.

SUMMARY OF THE INVENTION

In view of the foregoing perceived deficiencies, it is thus one aspect of the present invention to provide a windmill pumping device which converts rotational energy to energy to pump a liquid or gas. Thus, in one embodiment of the present invention, a wind driven pump is provided which utilizes a piston pump to move fluid or gas into a storage tank. Preferably the pump is capable of delivering the liquid or gas at a positive pressure at the point of discharge. The wide range of leverage available from a downhole swash plate design provides small amounts of fluid or gas to be moved with low wind velocities, while larger quantities can be pumped at higher wind speeds at the constant pressure required for each installation.

It is a further aspect of the present invention to provide an improved Savonious type wind motor which improves the efficiency of the windmill, and has a non-traditional geometric configuration. In a further aspect of the present invention, a wind deflection apparatus is provided in combination with the Savonious type wind motor, and which deflects upstream wind to one side of the Savonious wind motor, while decreasing wind on the other portion of the wind motor, and hence back pressure. Thus, in one embodiment of the present invention, a substantially triangular shaped wind deflector is provided along with a vertical fin tab which is positioned downstream of the Savonious wind motor.

The Savonious wind rotor also is superior to other wind rotors in that it can efficiently utilize wind gusts which can vary in direction of up to 70 degrees from the prevailing wind without the need to rotate the motor into the direction of the wind. The rotation about the vertical axis of a motor that is rotating about a horizontal axis causes stress and strain on the moving parts within the wind motor and the directional vane that turns the motor into the direction of the wind. This gyroscopic loading condition does not generally occur in the Savonious wind motor. As a further improvement to the present design, a deflector may be provided immediately upstream from the Savonious wind motor to enhance efficiency. The addition of this enhancer will detract from the efficient utilization of wind gusts but may be added if the maximum utilization of available power from low wind velocities is required. In one embodiment of the present invention, a brake is located just below the wind motor which is activated from within the well house. This brake will stop all power input to allow for maintenance and inspection of the various components of the present invention.

The performance data of the Savonious wind rotor used in the original design of this system was obtained from a report of studies performed for the Sandia Laboratories of Albuquerque, N. Mexico. The work was supported by the United States Department of Energy. Referenced in their report were works performed by S. J. Savonious, "The Wing Rotor in Theory and Practice", Savonious Company, Finland, 1928.

It is a further aspect of the present invention to provide a non-rotating swash plate type design to convert rotational energy to reciprocating vertical energy to move one or more pistons. Thus, a unique feature of the present pump design is that the swash plate does not rotate but simply wobbles about a center spherical bearing. This feature presents an advantage in that it eliminates the friction and wear between the piston push rods and a rotating swash plate. The "swashing" action is achieved through a driving yoke which rotates a swash drive around the bearing pedestal of the swash plate. These two parts are held together by two sealed ball bearings which allow only rotational movement between the two. The pistons are attached to and activated by push rods which have Teflon lined rod ends. This design feature also cuts down the wear and friction assuring a maintenance free, long life pump.

It is another aspect of the present invention to provide a speed control mechanism which automatically adjusts the tilt of the swash plate and the resulting stroke length of the piston push rods, and thus the output of the pump. Thus, in one embodiment of the present invention, a governor mechanism mounted on the direct drive rotating power shaft moves the tilt control rod which regulates the pitch of the swash plate and subsequently the stroke of the pump pistons. This pumping system is designed to pump fluid or gas into a storage tank that requires a constant head pressure at the pump, but not a constant flow. The power required to drive this pump varies with the volume of substance moved. The available power varies with the wind velocity and the governor mechanism regulates the output of the pump to match the required power with the available power from the wind.

As the wind velocity increases, the governor tilt control rod, which is attached on the lower end to the swash plate tilt mechanism increases the angle of inclination of the swash plate, thus lengthening the stroke of the pistons and increasing the volume of substance pumped. As the wind velocity decreases, the governor alters the position of the tilt control rod, which subsequently lowers the inclination of the swash plate and thus the stroke of the pistons. As the windmill and the interconnected rotating device shaft stop rotating, the governor returns to its position of no tension on the tilt control rod and the swash plate pump drive is positioned substantially perpendicular to the driving shaft and the pump is oriented to its neutral, or no pumping position. Stating this mathematically, "as the swash plate angle of inclination approaches zero, the mechanical advantage approaches infinity". This feature assures that the system will not stall in a position that the Savonious wind motor cannot drive even under wind velocities of three to five miles per hour, since the stroke length on the pistons is reduced proportionately as the wind speed declines.

It is a further aspect of the present invention to provide a wind driven pump which is capable of delivering a liquid or gas at a positive pressure at the pump output, as opposed to just increasing volume as the wind speed increases. The prototype pump of the present invention has been tested and proven capable of an output pressure of at least about 300 pounds per square inch, (psi). This design is not limited to 300 psi, but can be altered to accommodate any system requirements by varying the governor parameters (weights and arm lengths), to match the available wind power. Further, by utilizing a back pressure valve, the output pressure may be varied for the necessary application.

This invention will provide a supply of water from a well or other source as needed for domestic, livestock or other uses. Since the power source is not dependant upon electricity or fossil fuels this system can be used in remote areas where there is a supply of wind energy alone and limited maintenance is available. Further, by providing a positive pressure, a windmill may be provided at one elevation while the output is provided at an elevation above the windmill, such as at an outlying barn, building or storage tank.

It should additionally be appreciated by one skilled in the art that the present invention is not limited merely to applications related to the delivery of fluid or gas, but the energy created from the present windmill may be used in applications related to the generation of electricity to extract hydrogen and oxygen from water for use in fuel cells and other applications.

Examples of possible usage for the present invention are as follows:

a) Livestock water in remote areas beyond their normal range of travel and at elevations above the location of the windmill;

b) An independent, pressurized water supply for home use and fire protection;

c) Providing clean water to villages which have no public utilities;

d) Promote vegetation growth in arid climates, for both domestic livestock and wildlife habitat;

e) Bottling of methane gas from a methane generator for use as a fuel for an internal combustion engine; and f) Bottling of hydrogen and oxygen for use in regenerating a fuel cell.

Thus, in one aspect of the present invention, a wind driven pump is provided, which comprises:

a wind vane comprising at least one vane and which rotates about a center of axis;

a shaft operably interconnected to said wind vane, and which turns when said wind vane rotates, said shaft comprising a first portion positioned at a first location, and a second portion positioned at a second location;

a means for converting rotational energy to reciprocating energy which is operably interconnected to said second portion of said shaft on a first end and at least one piston on a second end;

at least one piston rod operably interconnected to said means for converting rotational energy to reciprocating energy on a first end and at least one piston on a second end, wherein when said wind vane rotates, said at least one piston reciprocates;

at least one pump chamber operably interconnected to said at least one piston, wherein when said at least one piston reciprocates, energy is provided to a column of fluid wherein said fluids travels to a predetermined location; and a means for selectively altering a stroke length of said at least one piston based on a speed of rotation of said wind vane.

DETAILED DESCRIPTION

Referring now to FIGS. 1–8, one embodiment of the present invention is shown wherein wind energy is transferred into mechanical energy that drives pumps at various speeds and/or strokes to provide pressurized liquid or gas. More specifically, a wind mill 30 is provided which drives a shaft 32 which is interconnected to a shaft speed governor mechanism 34 that controls the length of a tilt control rod 2 depending on the shaft 32 rotation speed. The tilt control rod 2 dictates the angle of inclination of a swash plate 23 which imparts energy to at least one pump. The pump 36 is generally located less than twenty five feet from the lowest level of the water table to assure that the atmospheric pressure will force water into the pump as air and water are removed from the pump. Alternatively, the present invention may supply similarly governed shaft energy for use in power generation.

Figure 1:
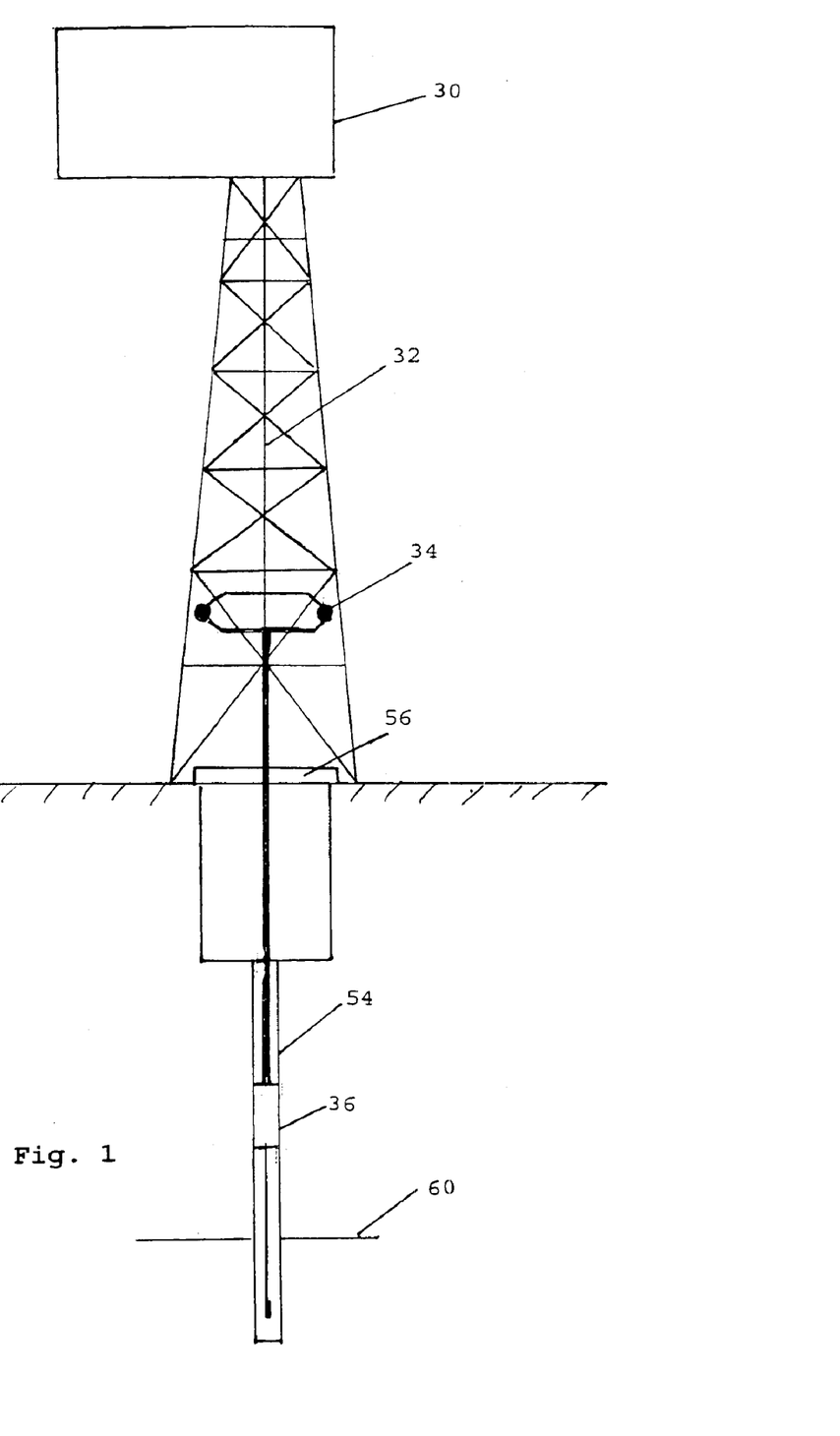
FIG. 1 is a front elevation view of the present invention.

When used to pump fluid from a well, the top of the well casing 54 must generally be located in a frost free area. This is achieved by an insulated cover 56 over the underground portion of the well house. In extremely cold conditions, where temperatures may drop to a −40 degrees F., it may be necessary to place a vapor barrier below the frost line in the lower portion of the well house. This will protect the pressure output line from freezing and also protect the pressure indicator gage and a shut-off valve that are in the output line.

Figure 2:
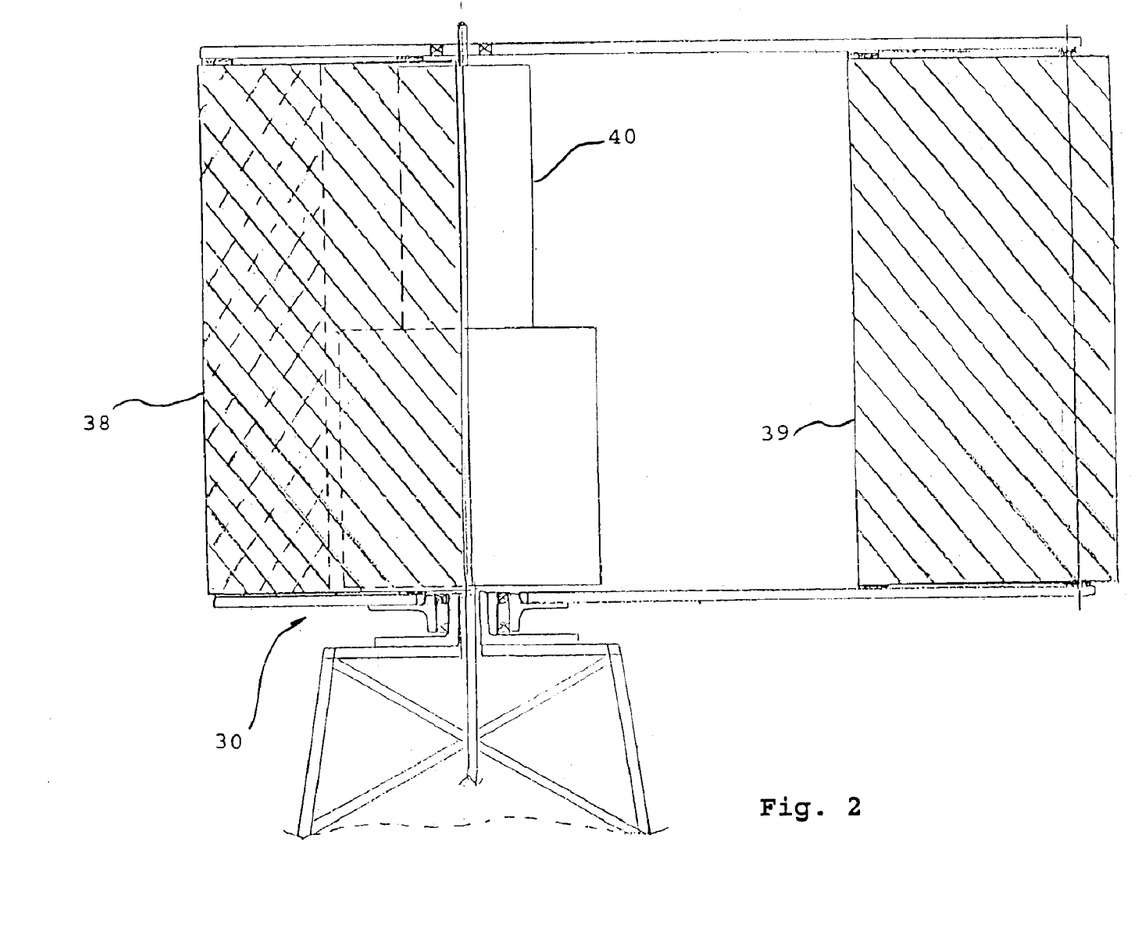
FIG. 2 is a partial front elevation view of the Savonious Rotor Power Enhancer of the embodiment shown in FIG. 1.
Figure 3:
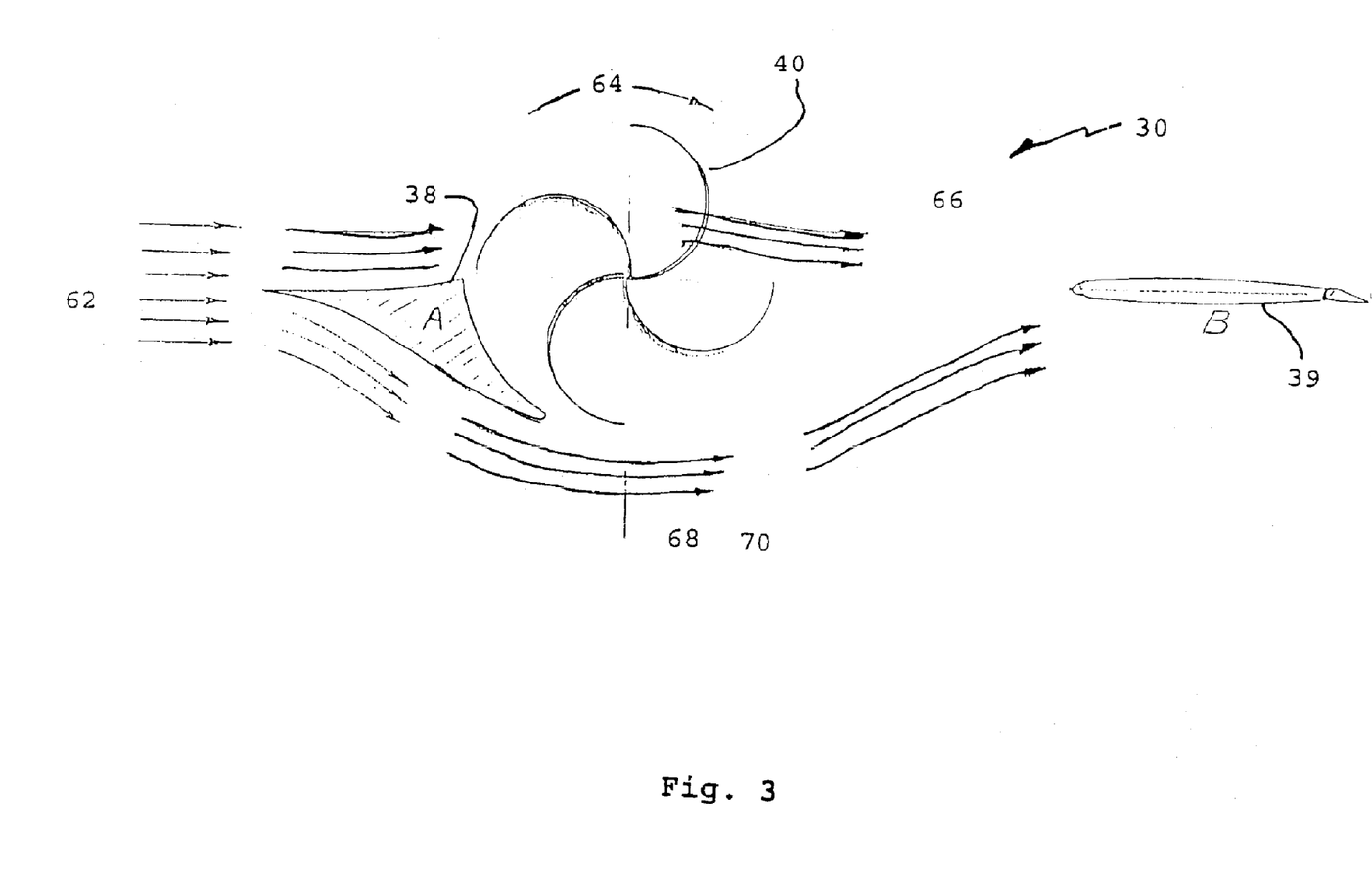
FIG. 3 is a top plan view of a portion of the Savonious Rotor Power Enhancer of the embodiment shown in FIG. 1.
Figure 4:
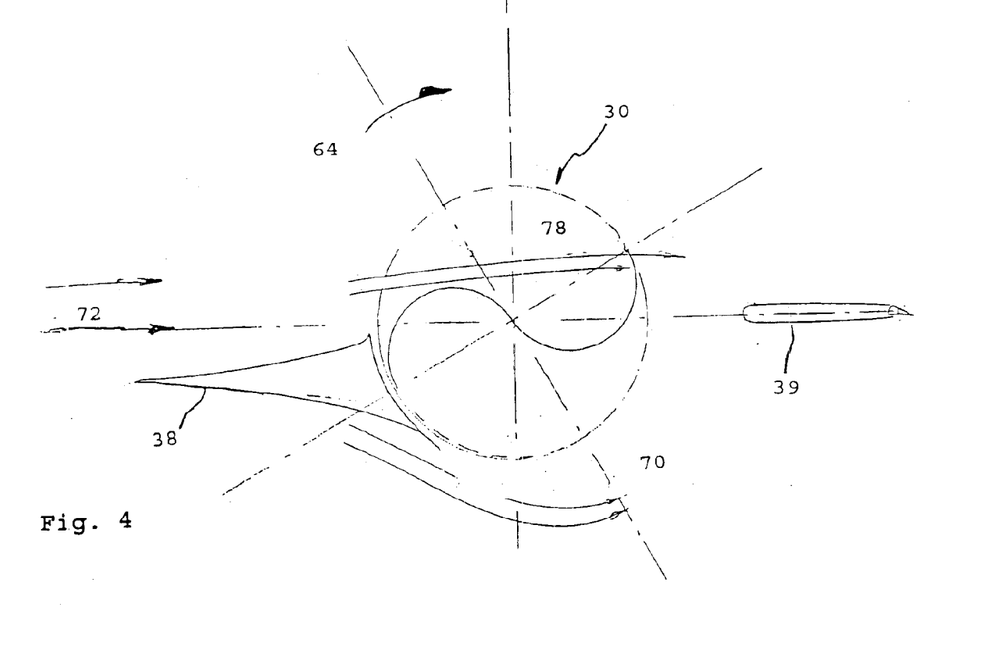
FIG. 4 are a top plan views of a portion of the Savonious Rotor Power Enhancer of the embodiment shown in FIG. 1.

Referring now to FIGS. 2–4, the wind power generation mechanism is shown herein. In one embodiment of the present invention a Savonious wind motor 30 is employed to convert wind energy into mechanical energy. In addition, a wind deflector 38 and vertical fin 39 may be employed in order to create more desirable aerodynamic effects which increase the pressure energy that turns a wind rotor 40.

Figure 5:
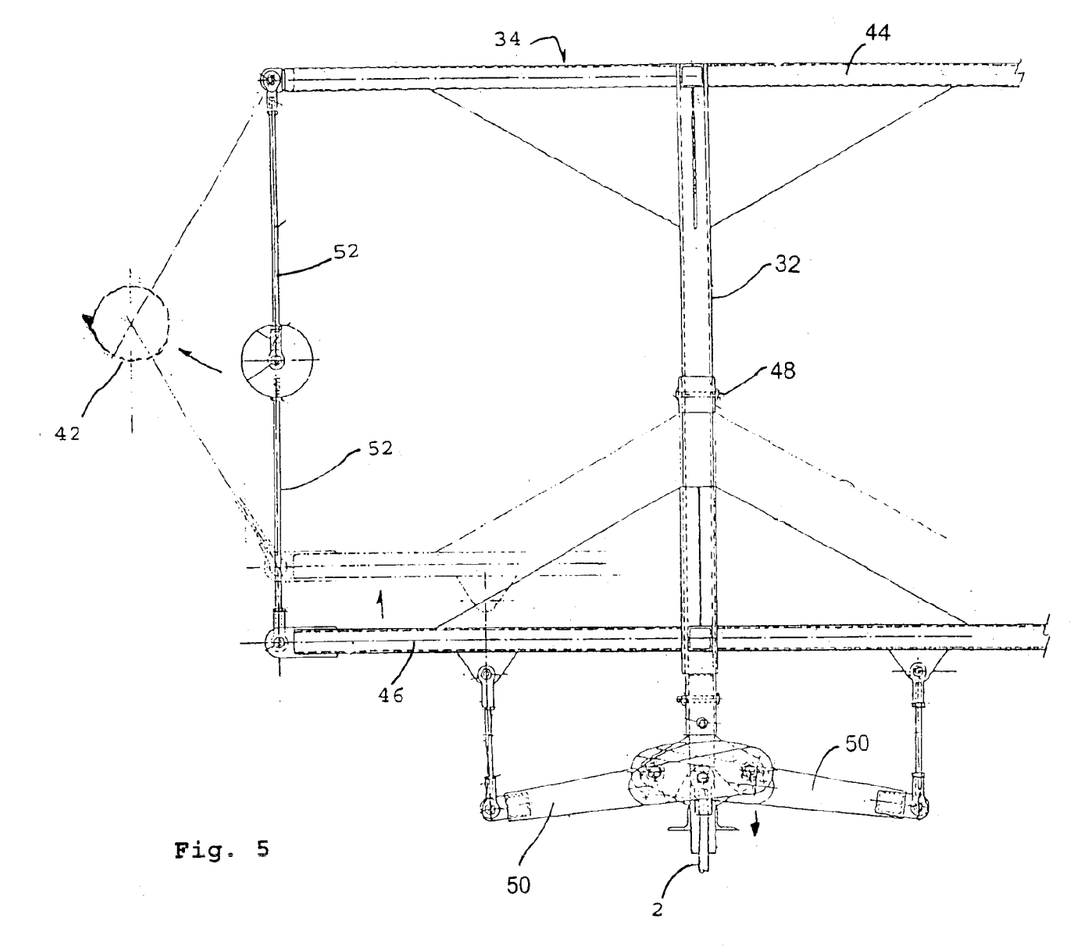
FIG. 5 is a front elevation view of the speed control/swash plate titling mechanism of the embodiment shown in FIG. 1.

Referring now to FIG. 5, the shaft speed governor mechanism 34 of one embodiment of the present invention is shown herein. The governor 34 of the present invention is typically located inside the well house on the power shaft 32. While rotating, the centrifugal force imparted on weights 42 moves them away from the center of rotation. Since an upper portion of the governor 44 is attached directly to the drive shaft 32, this outward movement of weights 42 raises a lower portion 46 until it reaches a stop 48. In addition, two lever assemblies 50 located on opposite sides of the rotating drive shaft 32 pivot about lugs attached to the drive shaft 32. The upward movement of the lower portion 46 of the governor increases as the rotation speed increases, this movement is transferred from two tension rods 52 to a tilt control rod 2 inside the rotating drive 32. The location of the stop 48 may be custom designed to each pump installation. Further, the stop 48 location above the non-rotating position of the lower portion 48 is determined such that the maximum pump piston travel can be achieved, but not exceeded. This distance is a function of the well depth, the output pressure of the system and the required movement of the pump pistons. Between the governor 34 and the top of the pump, the rotating drive shaft 32 contains the tilt control rod 2.

Figure 6:
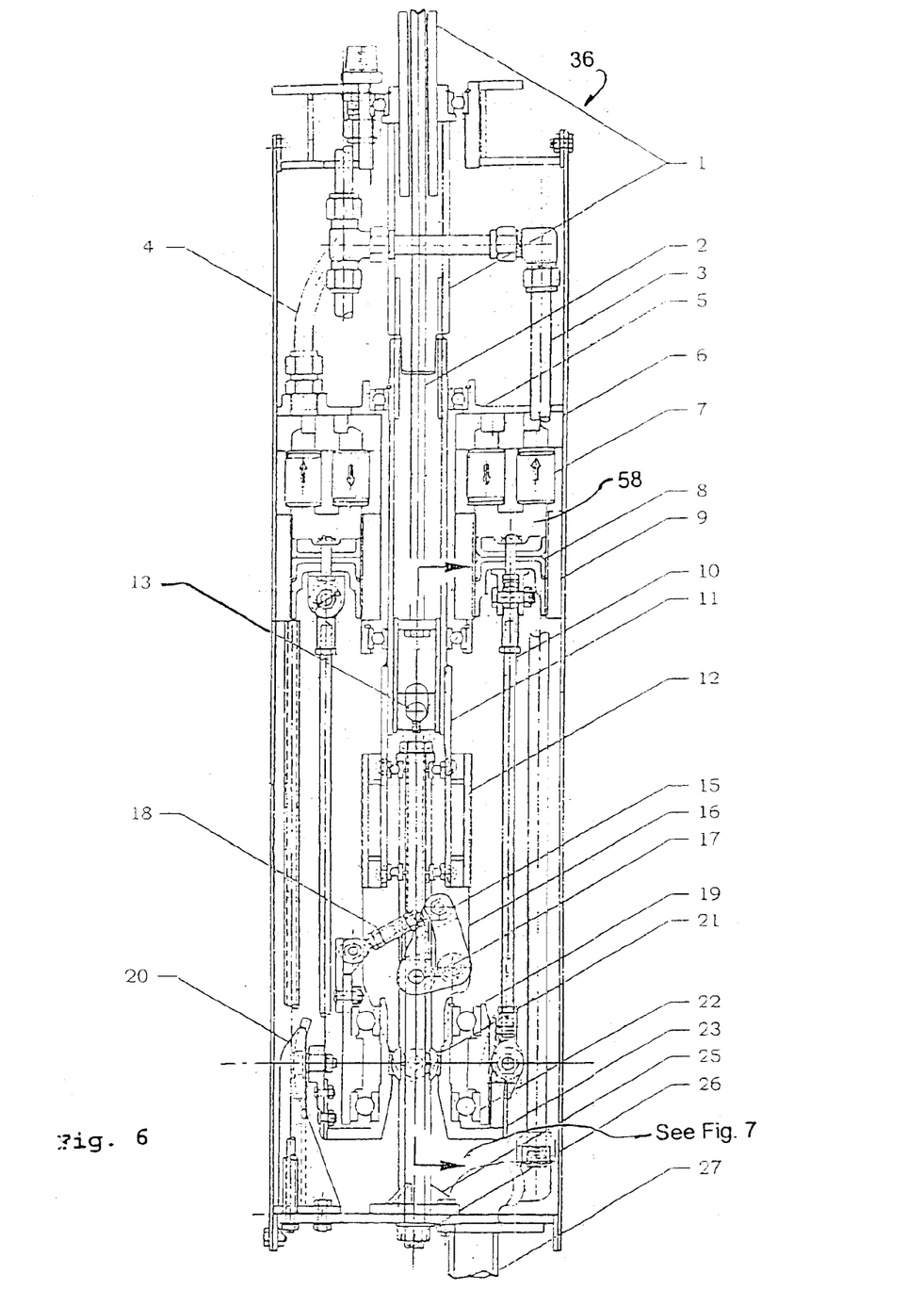
FIG. 6 is a front elevation view of a pump used in the embodiment shown in FIG. 1.
Figure 7:
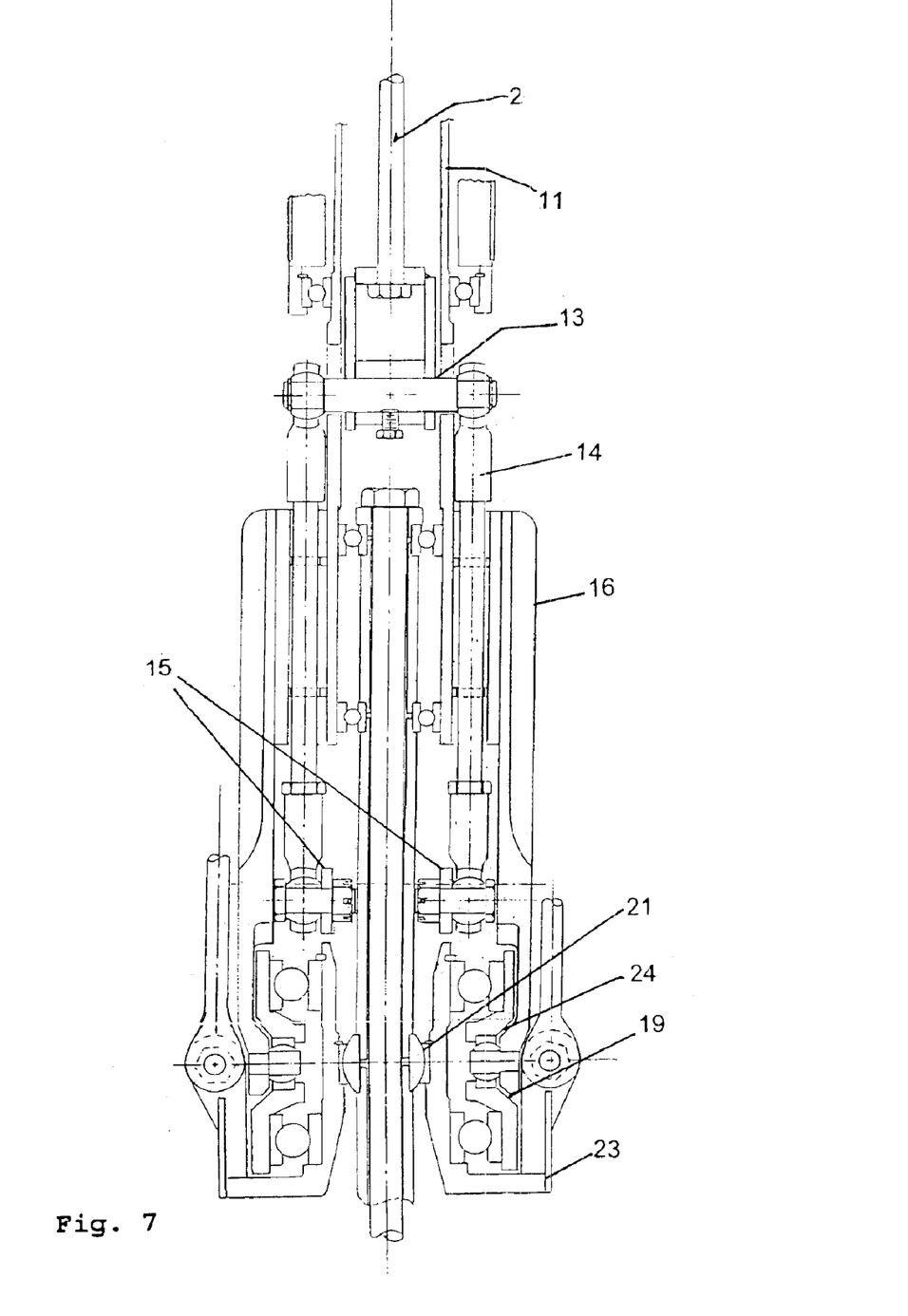
FIG. 7 is a partial right section view of the pump embodiment shown in FIG. 6.

Referring now to FIGS. 1, 6, and 7, the pump 36 of one embodiment of the present invention is shown herein. The pump 32 is suspended from the top of the well casing 54 by a torque tube sufficient in diameter to house the rotating drive shaft 32, a pressurized discharge line 4 and a priming line. The pump should not need a priming line as it does not require priming under normal working conditions, but the line is included for maintenance purposes and if necessary could be helpful for determining causes of failure in the future. The only moving parts in the torque tube are the drive shaft 32 containing the tilt control rod 2 which rotates with the drive shaft 32, and moves relative to the drive shaft as the wind velocity changes.

The drive shaft 32 is suspended in the torque tube and slips over a rotating pump drive 1. The rotating parts of the pump include, but are not limited to the rotating pump drive 1 and 11, the tilt control rod 2, a drive to yoke attach 12, a tilt control pin 13, a tilt control links 14, a tilt crank 15, drive yokes 16, a tilt crank pivot 17, a tilt control to drive links 18, and a swash drive 19. With the tilt control pin 13 at the lower point of travel as is shown, the lower flat portion of the swash plate 23 is generally perpendicular to the drive shaft center of rotation and there is no movement forced into it. Conversely, the tilt control pin 13 in the uppermost extent of travel will cause the maximum allowable stroke.

As the tilt control pin 13 is moved upward, it causes the tilt control links 14 to rotate the tilt crank 15 about its pivot point 17. This rotation causes a rotation of the swash drive 19 about the center point of a swash bearing 21 which also causes the swash plate 23 to assume a non-perpendicular position with respect to the center line of a support pedestal 25. The swash drive 19 and the swash plate 23 rotate together about a driving yoke pin 24. Considering FIG. 7, the far side of the swash plate 23 is moved downward as the tilt control rod 2 is moved upward. As this position is maintained with respect to the driving yoke pin 24, and rotates about the swash plate pedestal bearings 22, a piston 8 is forced down while the piston opposite is forced upward. This tilted rotation causes the inherent piston movement, which results in a pumping action and the inherent transfer of pressure energy to the liquid and thus fluid displacement.

In one embodiment of the present invention, there are flow directional control valves 7 located above each cylinder 58. At least one valve 7 is positioned to allow flow upward, or into the exhaust portion of a manifold 6, at least one other valve 7 allows only flow into the cylinder 58 from the inlet portion of the manifold 6, which completes the pumping cycle of the pump.

Figure 8:
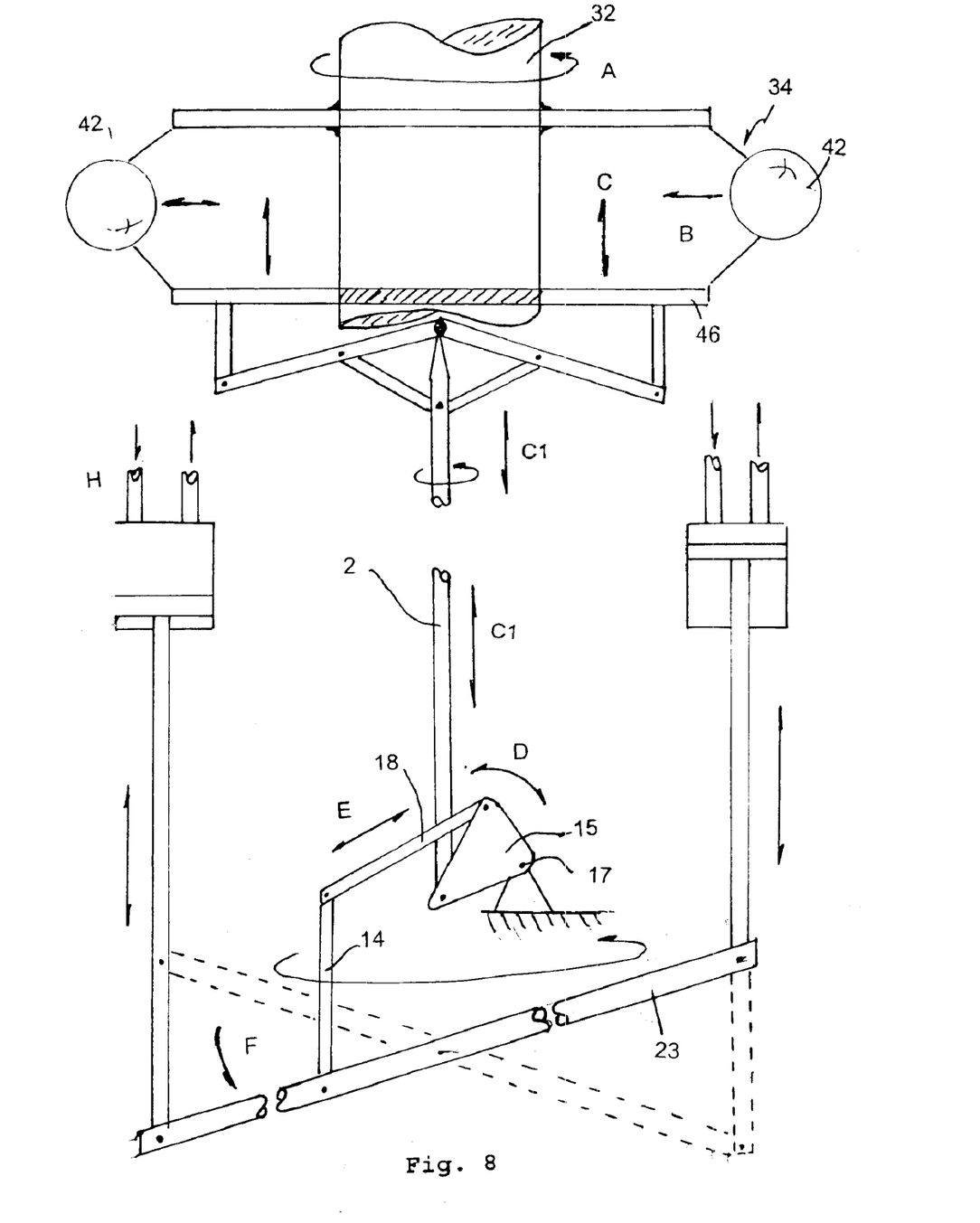
FIG. 8 is a partial front elevation view of the embodiment of the present invention shown in FIG. 1, wherein components are simplified or removed for clarity.

Referring now to FIG. 8, a simplified depiction of the pumping system is shown herein in order to more succinctly describe the energy conversion processes of the present invention. Initially, wind energy, or other fluid energy, is converted to mechanical rotational energy (A). Depending on the speed imparted on the shaft 32 the weights 42 will be displaced accordingly due to centrifugal force (B). The weight 42 displacement imparts displacement on the lower portion 46 of the governor mechanism 34 (C), which in turn pulls or pushes the tilt control rod 2 accordingly (C1). The movement of the tilt control rod 2 causes the tilt crank 15 to rotate about its pivot point 17 (D) and impart motion upon the tilt control drive link 18 (E). The tilt control drive link 18 in turn imparts motion onto the tilt control link 14 (F) which, by way of bearings causes the swash plate to incline. As the swash drive rotates the swash plate 23 wobbles thereby causing the piston push rods 10 to cycle (G). This cyclic motion causes pumping action (H) within the pump cylinders 58.

To assist in the understanding of the present invention the following list of components and associated numbering found in the drawings is provided herein.

1 Rotating pump drive
2 Tilt control rod
3 Inlet tube
4 Outlet tube
5 Manifold cover
6 Manifold
7 Flow directional control valve
8 Piston
9 Piston block assembly
10 Piston push rod
11 Rotating drive
12 Rotating drive to yoke attach
13 Tilt control pin
14 Tilt control link
15 Tilt crank
16 Drive yoke
17 Tilt crank pivot
18 Tilt control to drive link
19 Swash drive
20 Swash positioning guide
21 Swash bearing
22 Swash plate pedestal bearing
23 Swash plate
24 Driving yoke pin
25 Support pedestal
26 Pedestal support bolt
27 Pump inlet
30 Savonious wind motor
32 Direct Rotational Drive Shaft
34 Governor Mechanism
36 Pump
38 Wind Deflector
39 Vertical Fin
40 Wind Rotor
42 Weight
44 Upper Governor Portion
46 Lower Governor Portion
48 Governor Stop
50 Lever Assembly
52 Tension Rod
54 Well Casing
56 Insulated Cover
58 Pump Cylinder
60 Water Level
62 Undisturbed Air Flow
64 Rotation
66 Shorter Path Higher Pressure
68 Longer Path Faster Speed
70 Lower Pressure
72 Wind Direction
74 Air Flow
76 Trim Tab
78 Higher Pressure While various embodiment of the present invention have been described in detail, it is apparent that modifications and abdications of those embodiments will occur to those skilled in the art. However, it is to be expressly understood that such modifications abdications are within the scope and spirit of the present invention, as set forth in the following claims.

What is claimed is:

1. A wind driven pump, comprising:
   a wind vane comprising at least one vane and which rotates about a center of axis;
   a shaft operably interconnected to said wind vane, and which turns when said wind vane rotates, said shaft comprising a first portion positioned at a first location, and a second portion positioned at a second location;
   a means for converting rotational motion to reciprocating motion which is operably interconnected to said second portion of said shaft on a first end and at least one piston on a second end;
   at least one piston rod operably interconnected to said means for converting rotational motion to reciprocating motion, wherein when said wind vane rotates a piston interconnected to said piston rod reciprocates;
   at least one pump chamber operably interconnected to said at least one piston, wherein when said at least one piston reciprocates, energy is provided to a column of fluid wherein said fluids travels to a predetermined location; and
   a means for selectively altering a stroke length of said at least one piston based on a speed of rotation of said wind vane.

2. The wind driven pump of claim 1, wherein said wind vane comprises a Savonious wind motor.

3. The wind driven pump of claim 1, further comprising a wind deflector positioned upstream from said wind vane, wherein the efficiency of said wind vane is increased.

4. The wind driven pump of claim 3, wherein said wind deflector has a substantially triangular shape.

5. The wind driven pump of claim 1, wherein said means of converting rotational motion to reciprocating motion includes a swash plate.

6. The wind driven pump of claim 1, further comprising a governor interconnected to said shaft on a first end and operably interconnected to said means for converting rotational motion on a second end, wherein when said shaft rotation speed increases, a stroke length of said at least one piston increases.

7. The wind driven pump of claim 6, wherein said governor is interconnected to said means for converting rotational motion with a tilt control rod.

8. The wind driven pump of claim 5, wherein the inclination of said swash plate increases with respect to said shaft as the rotational speed of said shaft increases.

9. The wind driven positive displacement pump of claim 1, wherein said pump delivers a liquid with a positive pressure at the surface of the earth.

10. The wind driven pump of claim 1, wherein said pump adapted to pressurize and deliver gas under pressure to a predetermined location.

11. The wind driven pump of claim 1, wherein said means for selectively increasing a stroke length of said at least one piston based on a speed of rotation of said wind vane is adapted to decrease said stoke length as wind energy is decreased such that said pump is not capable of stalling wherein a high winds would be required for re-start.

* * * * *